United States Patent [19]

Wakihira et al.

[11] Patent Number: 4,878,788
[45] Date of Patent: Nov. 7, 1989

[54] DRILL FOR DRILLING A THIN PLATE

[75] Inventors: Koichiro Wakihira, Kobe; Michitaka Katsuta, Kakogawa; Masayasu Hino, Akashi; Toshio Sasayama, Himeji, all of Japan

[73] Assignee: Kabushiki Kaisha Kobe Seiko Sho, Kobe, Japan

[21] Appl. No.: 298,015

[22] Filed: Jan. 18, 1989

[30] Foreign Application Priority Data

Aug. 4, 1988 [JP] Japan ................................ 63-196397

[51] Int. Cl.⁴ ............................................. B23B 51/02
[52] U.S. Cl. .................................... 408/230; 408/199
[58] Field of Search ............................... 408/223–225, 408/230, 715, 199

[56] References Cited

U.S. PATENT DOCUMENTS 3,237,488 3/1966 Parone et al. ...................... 408/230

FOREIGN PATENT DOCUMENTS 137898 4/1985 European Pat. Off. ............ 408/225

Primary Examiner—Steven C. Bishop
Attorney, Agent, or Firm—Oblon, Spivak, McClelland, Maier & Neustadt

[57] ABSTRACT

Disclosed is a drill for drilling thin plates and which has a pair of major cutting edges each including an inner major cutting edge diagonally extending in an inner portion of the tip so as to form a protrusive leading part, and an outer major cutting edge radially extending in the tip, a chisel edge formed at the junction of the inner major cutting edges, and continuous flanks formed behind the inner major edges and the outer major cutting edges, respectively. The diameter of the leading part formed by the inner major cutting edges is in the range of 40 to 50% of the drill diameter, the point angle formed between the inner major cutting edges is in the range of 100° to 115°, the outer corner angle formed between the outer major cutting edge and a plane perpendicular to the axis of the drill is in the range of 4° to 10°, and no margin is formed in the circumference of the tip.

4 Claims, 4 Drawing Sheets

DRILL FOR DRILLING A THIN PLATE

BACKGROUND OF THE INVENTION

1. Field of the Invention

The present invention relates generally to a drill and, more particularly, to a drill suitable for drilling a thin plate.

2. Description of the Prior Art

A drill suitable for drilling a thin plate is disclosed, for example, in Japanese Patent Laid-open (Kokai) No. 58-149115. This drill has a protrusive leading part protruding from the central part of the front end of the body. This drill will be described briefly with reference to FIGS. 6 and 7.

Referring to FIGS. 6 and 7, the drill has a pair of major cutting edges, and a chisel edge 3 at the junction of the major cutting edges. Each major cutting edge consists of an inner major cutting edge 1 forming the radially inner portion of the major cutting edge, and an outer major cutting edge 2 forming the radially outer portion of the major cutting edge. The pair of inner major cutting edges 1 project diagonally relative to the outer major cutting edges 2 toward the chisel edge 3 to form a protrusive leading part. A primary flank 5a and a secondary flank 5b, and a primary flank 6a and a secondary flank 6b are formed respectively behind each inner major cutting edge 1 and each outer major cutting edge 2. The secondary flanks 5b and 6b are inclined respectively at acute angles relative to the corresponding primary flanks 5a and 6a to secure chip spaces behind the primary flanks 5a and 6a. Indicated at 4 are web thinnings and at 7 are margins formed in the circumference of the drill body. The point angle b formed between the pair of inner major cutting edges 1 is approximately 105°, and the outer corner angle a, namely, the inclination of the outer major cutting edge 2 to a plane perpendicular to the axis of the drill, is zero. The pair of inner major cutting edges 1 forming the protrusive leading part cut well into a workpiece to position and lead the drill securely and precisely, which is particularly advantageous in drilling a hole with a hand drill.

However, since the flank of this known drill consists of the primary flanks 5a and 6a and the secondary flanks 5b and 6b, the thickness of the back metal near the major cutting edges, particularly, around the primary flanks 5a and 6a, is very small, and hence the cutting edges have a comparatively low strength and are subject to chipping.

SUMMARY OF THE INVENTION

Accordingly, it is an object of the present invention to provide a drill with a leading part, and cutting edges having a sufficiently high strength.

To achieve the object of the invention, the present invention provides a drill having inner major cutting edges and outer major cutting edges each followed by a single continuous flank instead of two individual flanks. Accordingly, a back metal piece having a sufficiently large thickness is formed near the major cutting edges to provide the major cutting edges with a sufficiently high strength and to reduce the possibility of chipping.

The aforesaid known drill is not designed particularly for use in drilling thin plates. The flank in the tip of the drill is divided into the primary flanks and the secondary flanks to secure a sufficient space for removing chips. The present invention has been made on the basis of the fact that no problem arises in disposing of chips even if the drill is not provided with secondary flanks when the drill is used only for drilling thin plates, because only a small amount of chips is produced in drilling thin plates.

In a first aspect of the present invention, a drill has a pair of inner major cutting edges which scribe a circle having a diameter in the range of 40 to 50% of the drill diameter. When the diameter of the circle is not greater than 40% of the drill diameter, an excessive thrust acts on the pair of inner mjor cutting edges entailing chipping and rapid abrasion of the inner major cutting edges, and thus the life of the drill is reduced. On the other hand, when the diameter of the circle is not smaller than 50% of the drill diameter, resistance against the drill increases, and hence the leading part of the drill is unable to cut readily into the workpiece.

In a second aspect of the present invention, a drill has a point angle formed between the inner major cutting edges in the range of 100° to 115°, which is smaller than the point angle in the range of 118° to 130° of ordinary drills. Accordingly, the leading part of the drill cuts well into a workpiece. However, when the point angle is not greater than 100°, the strength of the inner major cutting edges diminishes sharply. When the point angle is not less than 115°, the ability to cut into a workpiece is insufficient.

In a third aspect of the present invention, a drill has an outer corner angle, namely, an angle between the outer major cutting edge and a plane perpendicular to the axis of the drill, is in the range of 4° to 10°. Burrs are left of the edge of a hole drilled with the ordinary drill having an outer corner angle of 0°, while burrs scarcely remain on the edge of a hole drilled with the drill having an outer corner angle in the range of 4° to 10°.

In a fourth aspect of the present invention, no margin is formed on the circumference of the tip of a drill, and hence the tip of the drill has a smooth circular shape. As best shown in FIG. 6, the aforesaid known drill, similarly to the ordinary drills, has margins of a very small width, because friction between the workpiece and margins having a large width increases drilling load. However, in the drilling a thin plate, the guiding performance of margins having a small width is insufficient, and hence a hole drilled with a drill having such small margins in a thin plate has a low accuracy; that is, the hole has an inferior roundness and a high degree of surface roughness. In drilling with the drill of the present invention, the drill is guided satisfactorily by the entire circumference of the tip thereof, so that the drill is able to form an accurate hole in a thin plate. In drilling a thin plate, the drilling load is not a significant problem, and hence the drill need not be provided with small margins.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENT

Figure 1:
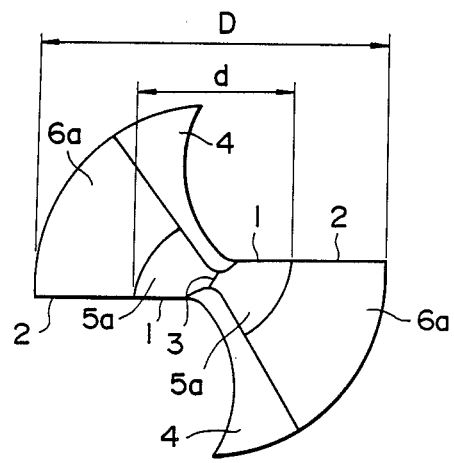
FIG. 1 is an end view of a drill embodying the present invention.
Figure 2:
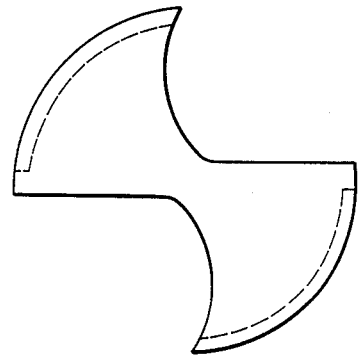
FIG. 2 is a sectional view of the drill of FIG. 1, taken on a plane perpendicular to the axis of the drill at a position near the tip.
Figure 3:
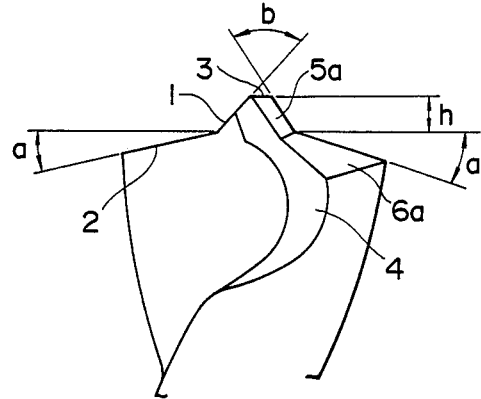
FIG. 3 is a fragmentary side elevational view of the drill of FIG. 1.

Referring to FIGS. 1 to 3, the tip of a drill embodying the present invention has a pair of major cutting edges and a chisel edge 3 formed at the junction of the major cutting edges. Each major cutting edge consists of an inner major cutting edge 1 and an outer major cutting edge 2. The pair of inner major cutting edges 1 extend from the corresponding outer major cutting edges 2 diagonally to the front to form a protrusive leading part.

Formed behind the inner major cutting edges 1 and the outer major cutting edges 2 with respect to the circumferential direction are continuously extending flanks 5a and 6a, respectively. The diameter d of a circle scribed by the pair of inner major cutting edges 1 is in the range of 40 to 50% of the drill diameter D. The point angle b formed between the pair of inner major cutting edges 1 is in the range of 100° to 115°. The outer corner angle a formed between each outer major cutting edge 2 and a plane perpendicular to the axis of the drill is in the range of 4° to 10°. The drill is not provided with any margin and the entire circumference of the tip portion of the drill is circular. Therefore, during a drilling operation, the circumference of the drill excluding portions corresponding to flutes is in sliding contact with the inner circumference of a hole being drilled. Indicated by broken lines in FIG. 2 are the margins and circumference of the aforesaid known drill. The height h of the inner major cutting edges 1 is in the range of 10 to 30% of the drill diameter D. Web thinnings 4 are formed in the tip to form the chisel edge 3 in a width in the range of 3 to 20% of the drill diameter D. The width of the chisel edge 3 has been determined taking into considertion the ability of cutting into a work of the chisel edge 3, thrust which will act on the drill, and the strength and wear resistance of the major cutting edges.

Experiment 1

Drills having different point angles b and an outer corner angle of 5° meeting the present invention, and standard straight shank twist drills (JIS B 4301) as controls were subjected to comparative durability tests on a bench drilling machine under the following test conditions.

| | |
|---|---|
| Spindle speed | 610 rpm |
| Feed | Hand feed |
| Drilling depth | 1.6 mm |
| Workpiece | 1.6 mm thick steel plate (JIS SS41) |
| Cutting fluid | None |
| Drill diameter | 6.5 mm |
| Diameter of leading part | 2.9 mm |

Figure 4:
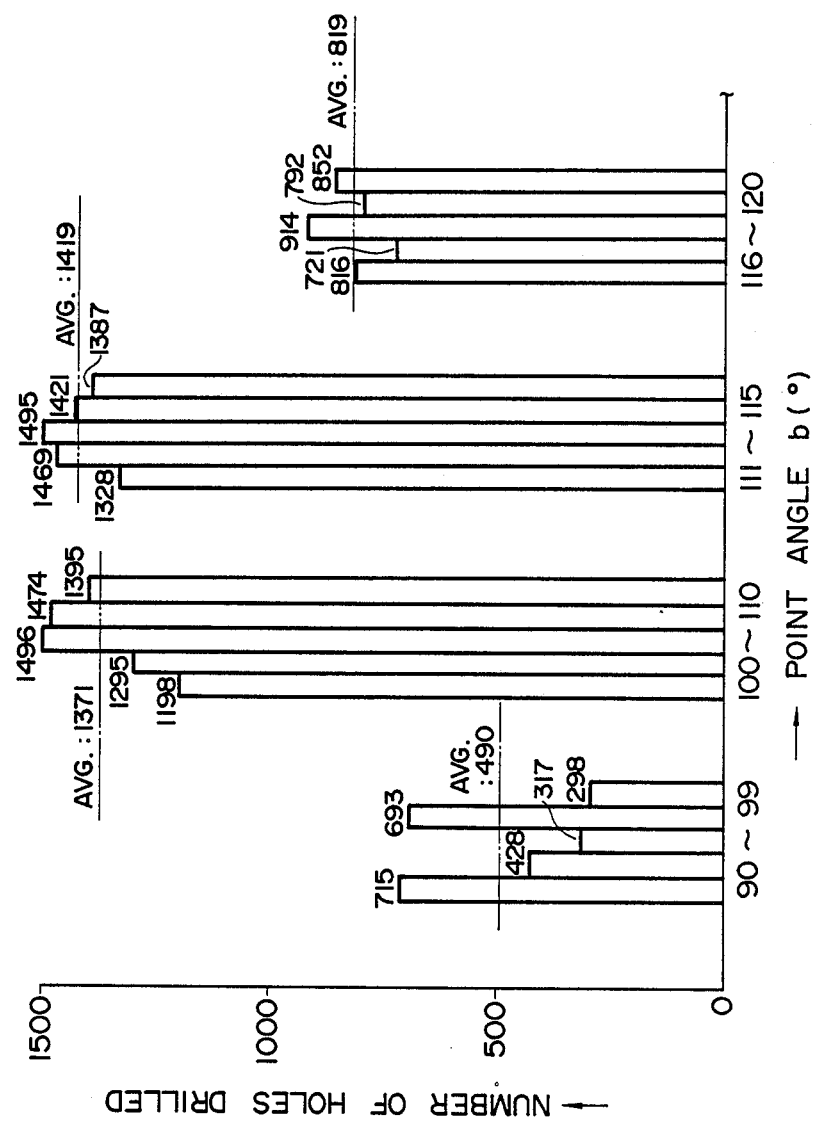
FIG. 4 is a graph comparatively showing the results of life tests of drills in accordance with the present invention and conventional drills.

The durability was evaluated in terms of the number of holes drilled by the drill within the service life of the same. The end of the service life was determined when the major cutting edges are chipped. It is known from FIG. 4 that the average number of holes drilled by each of the drills is 490 for drills having a point angle b in the range of 90° to 99°, 819 for drills having a point angle b in the range of 116° to 120°, 1371 for drills having a point angle b in the range of 100° to 110°, 1419 for drills having a point angle b in the range of 111° to 115°, and about 700 for the standard straight shank twist drills. Apparently, the service life of the drills in accordance with the present invention is approximately twice that of the conventional drills.

Experiment 2

Drills meeting the requirements of the present invention and having an outer corner angle in the range of 4° to 10°, and those meeting the requirements of the present invention except the outer corner angle a and having outer corner angles in the range of 0° to 3°, 7° to 10°, 11° to 15° and 16° to 20° were subjected to drilling tests on a bench drilling machine to find out the effect of the outer corner angle a on the size of burrs under the following test conditions.

| | |
|---|---|
| Drill diameter | 3.5 mm |
| Spindle speed | 1650 rpm |
| Workpiece | 1.0 mm thick Steel plate (JIS SS41) |
| point angle | 110° |
| Diameter of leading part | 1.6 mm |

Figure 5:
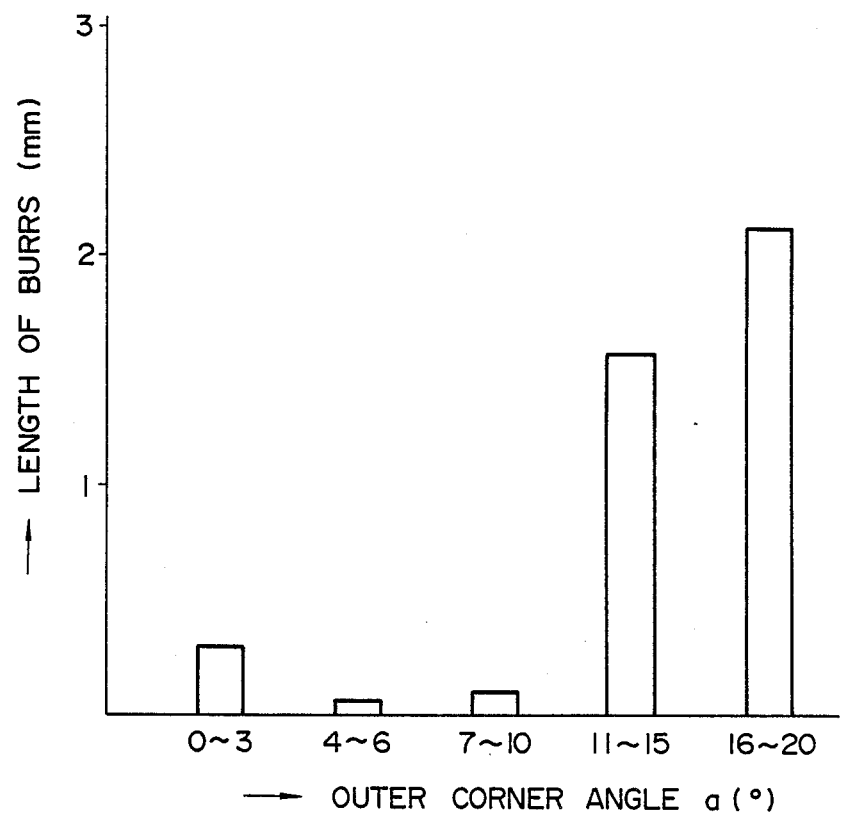
FIG. 5 is a graph showing the relation between the outer corner angle a and the length of the burrs.
Figure 6:
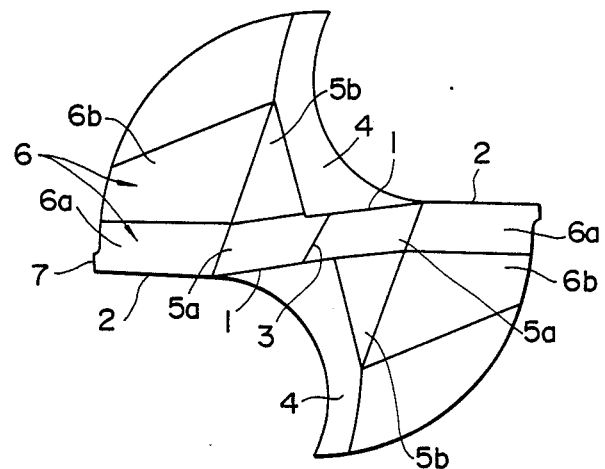
FIG. 6 is an end view of a drill of the prior art drill.
Figure 7:
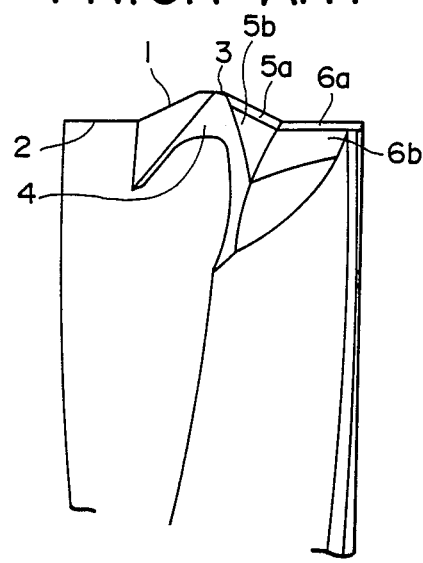
FIG. 7 is a fragmentary side elevational view of the drill of FIG. 6.

The results of the tests are shown in FIG. 5. It is obvious from FIG. 5 that burrs formed by the drills having an outer corner angle in the range of 4° to 10° are the smallest.

Although the invention has been described in its preferred form with a certain degree of particularity, obviously many changes and variations are possible therein. It is therefore to be understood that the present invention may be practiced otherwise than specifically described herein without departing from the scope and spirit thereof.

What is claimed is:

1. A drill for drilling thin plates, having a pair of major cutting edges each of which comprises:
   a tip;
   an inner major cutting edge diagonally extending in a radially inner portion of the tip so as to form a protrusive leading part;
   an outer major cutting edge extending in a radially outer portion of the tip;
   a chisel edge formed at the junction of the pair of major cutting edges;
   continuous flanks extending behind the inner major cutting edges and the outer major cutting edges, respectively, wherein:
   the diameter of a circle scribed by the pair of inner major cutting edges is in the range of 40 to 50% of the drill diameter,
   the point angle formed between the inner major cutting edges is in the range of 100° to 115°, and
   the outer corner angle corresponding to an angle formed between each outer major cutting edge and a plane perpendicular to the axis of the drill is in the range of 4° to 10°, wherein no margins are formed on the circumference of the tip and the circumference of the tip has a substantially circular shape.

2. A drill for drilling thin plates as claimed in claim 1, wherein the height of the inner major cutting edge is in the range of 10 to 30% of the drill diameter.

3. A drill for drilling thin plates as claimed in claim 1, which comprises web thinnings formed in the tip to form a chisel edge of a width in the range of 3 to 20% of the drill diameter.

4. A drill for drilling thin plates as set forth in claim 1, wherein the height of the inner major cutting edge is in the range of 10 to 30% of the drill diameter and which comprises web thinnings formed in the tip to form a chisel edge of width in the range of 3 to 20% of the drill diameter.

* * * * *